Patented Sept. 17, 1946

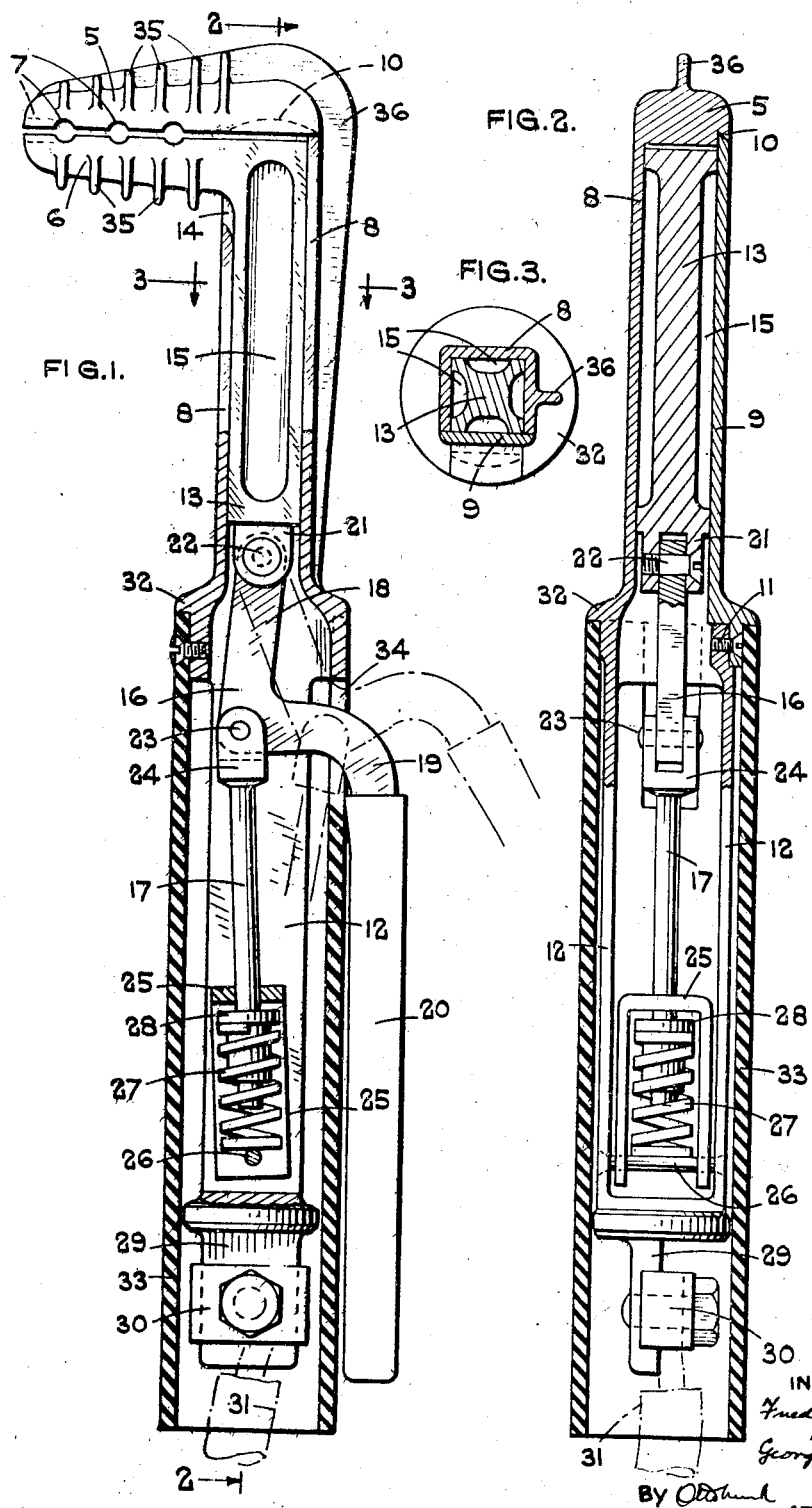

2,407,836

UNITED STATES PATENT OFFICE 2,407,836

ELECTRODE HOLDER FOR USE IN ELECTRIC WELDING

Frederick George Ketelbey and George Mason, Birmingham, England

Application January 16, 1945, Serial No. 573,024
In Great Britain January 26, 1944

10 Claims. (Cl. 219—8)

This invention relates to electrode holders for use in electric arc welding, and refers to that kind of electrode holder which incorporates a pair of jaws adapted to grip the electrode, one of the jaws being provided with a shank to which the electric cable can be connected.

In electrode holders of the kind referred to as at present generally made, the grip obtained upon the electrode is usually dependent upon direct pressure from a spring, and when it is desired to move the jaws apart for releasing the electrode, considerable force must usually be exerted to overcome the pressure of the spring, so that sometimes the operator has to use both hands in order to release the electrode.

Further, it is a common experience for these electrode holders to become very hot after a period of use, and frequently the heat affects the strength of the spring so that the grip on the electrode becomes ineffective.

The less effective the grip upon the electrode becomes, the higher the resistance developed at the zone of contact between the holder and the electrode, whereby the heating effect is enhanced and the deterioration of the spring accelerated.

The object of the present invention is to provide an improved construction of electrode holder.

An electrode holder constructed in accordance with the present invention comprises a pair of jaws movably associated together, and toggle mechanism associated with and operating one jaw to effect the closing movement of the jaws against spring pressure.

The invention also provides an electrode holder of the kind referred to, including a pair of jaws movably associated together, and toggle mechanism for moving the jaws in relation to one another.

Preferably, the toggle links are arranged to pass slightly over a dead-centre position when the jaws are being closed on to the electrode, so that the grip on the electrode is maintained automatically without the necessity of the operator maintaining any pressure upon the operating handle.

Further, as a result of this arrangement, when it is desired to release the electrode, the operator has merely to move the operating handle a short distance to pass the dead-centre position in the reverse direction when the spring acts to open the jaws.

Each jaw may be fixed on or formed integrally with a shank, the jaws being disposed at right angles to the shanks, and the shank of one jaw may be of tubular form in which the shank of the other jaw can slide, and the toggle links may be connected between one end of the shank of the sliding jaw and a pin or abutment carried by the tubular shank, the toggle links being thus normally housed within the tubular shank.

The tubular shank may be slotted, and one of the toggle links may be extended and provided with a lever handle whereby the toggle links may be operated.

The spring may be incorporated with one of the toggle links.

A further feature of the present invention is to provide the gripping jaws of the holder with heat radiating fins.

Referring to the drawing:

Figure 1 is an elevation partly in section.

Figure 2 is a part-sectional elevation on line 2—2 of Figure 1.

Figure 3 is a sectional plan on line 3—3 of Figure 1.

In the construction illustrated, the electrode holder includes a pair of jaws 5 and 6 provided in their adjacent faces with transverse and longitudinal grooves 7 to receive a cylindrical electrode to be gripped in the holder. The jaw 5, hereinafter referred to as the fixed jaw, projects transversely from one end of a tubular shank 8 which comprises a main part of a channel section formed integrally with the jaw 5, and a removable plate 9 closing the open side of the channel. This plate 9 is chamfered at one end to fit into an undercut 10 formed in the fixed jaw at the end of the open side of the channel-like shank, whilst at its other end the plate is fixed by a screw 11 to a tubular socket 12 formed integrally with, and as a continuation of, the shank 8.

Slidably mounted within the hollow shank 8 is a further shank 13 formed integrally with the jaw 6, hereinafter referred to as the movable jaw, which projects transversely from one end of the shank 13 and extends through a slot 14 in the hollow shank 8. This shank 13 is of solid square section with shallow grooves 15 formed longitudinally in the sides of the shank to localize the areas of contact between the two shanks and to facilitate cooling thereof.

The two shanks are connected together by toggle mechanism including a pair of toggle links 16 and 17, the link 16 being of substantially L shape, one arm 18 of this link co-operating with the link 17 to form the toggle whilst the other arm 19 projects through a slot in the tubular socket 12 and carries an operating handle 20.

At its inner end the sliding shank 13 is formed with a pair of spaced lugs 21, and the end of the arm 18 of the L shaped toggle link fits between these lugs and is pivoted therein on a screw 22 passed through aligned holes in the lugs and the end of the arm.

Near the junction of the two arms of the L shaped toggle link is formed a hole for a pivot pin 23 passing through further holes in the forked end 24 of the second toggle link 17 which at its other end passes slidably through a hole in the top of an inverted U shaped stirrup 25 pivoted on a pin 26 fixed in the opposite side walls of the tubular socket 12.

A strong compression spring 27 is mounted in the stirrup 25 around the end of the link 17, this spring acting between the pin 26 and a shouldered abutment 28 mounted on the end of the toggle link 17.

The pivotal connections 22, 23 and 26 have their axes on mutually parallel lines.

An integral lug 29 is provided on the tubular socket 12 for the connection, by means of a clamping bolt 30, of the conductor of the cable 31, and at the other end of the tubular socket 12 is an integral flange 32 against which abuts one end of a tubular insulating handle 33 which is slid endwise over the socket 12 to cover the toggle mechanism and the lug 29 and bolt 30. This handle 33 is slotted at 34 to provide the necessary clearance for the arm 19 of the toggle link protruding through the slot in the socket 12, and the handle is secured in position on the socket 12 by a screw 34'.

The fixed and movable jaws 5 and 6 are formed with integral heat radiating fins 35 which project from the exterior of the jaws in spaced parallel planes at right angles to the length of the jaws, whilst a further integral fin 36 extends longitudinally down the fixed jaw and down the tubular shank 8 to the junction with the tubular socket 12.

When the holder is in use, the operating handle 20 is moved to the position shown in dotted lines in Figure 1 in which this handle 20 is inclined to the length of the shanks at an angle of about 30°. In this position the jaws 5 and 6 are open, the sliding shank 13 having been slid downwardly in the hollow shank 8 from the position shown in Figure 1, so as to move the movable jaw 6 away from the fixed jaw 5. As is indicated in dotted lines in Figure 1, the connected ends of the toggle links 16 and 17 protrude somewhat through the slot in the tubular socket 12 and into the slot 34 in the insulating handle 33.

To close the jaws from this open position, the handle 20 is moved from the dotted to the full line position in Figure 1, the first portion of this movement causing the toggle link 17 and the arm 18 of the L shaped toggle link to move more and more into alignment up to the dead-centre position when the link 17 and the arm 18 are in line and the pivots 22, 23 and 26 are also in line. The final portion of the closing movement takes the toggle links slightly beyond the over-dead-centre position to the final closed position shown in full lines in Figure 1 from which it will be seen that the pivot axis of the pin 23 is slightly to the left of a line joining the pivots 22 and 26.

Only a small movement is required from the open to the closed position, and the sliding jaw is slid towards the fixed jaw so as to grip an electrode inserted in any of the grooves 7.

During this closing action the handle 20 moves towards the side of the insulating handle 33 and may move into contact with the side of the handle 33, and thus form a stop for the motion of the toggle links.

For the first part of the closing movement the spring 27 is compressed heavily until the over-dead-centre position is reached, and when the toggle links move only slightly beyond the dead-centre position, the heavily compressed spring acts to retain the jaws in the closed position. The movement of the toggle links beyond the dead-centre position is only very slight, but it is sufficient to ensure that the grip of the jaws on the electrode is maintained automatically without the necessity of the operator maintaining any pressure on the operating handle 20. Further, to move the jaws to the open position from the closed position, the toggle links have to be moved only a short distance past the dead-centre position in the reverse direction when the compression of the spring acts to slide the movable shank and jaw away from the fixed jaw and thus to release the electrode without requiring the exercise of any considerable force by the operator.

The construction is preferably such that the shank of the movable jaw can be placed within the tubular shank of the fixed jaw through the open side of the channel which is afterwards closed by the plate 9, and the shank 8 and toggle mechanism are enclosed within the tubular shank and the tubular socket 12.

Cooling of the jaws and shanks is facilitated by the heat radiating fins 35 and 36 which help to dissipate heat conducted from the electrode.

Each of the jaws 5 and 6 may be made integral with its shank as a casting.

As the cable 31 is connected to the end of the tubular socket 12, the greater part of the current will be conducted by the tubular shank. In some cases, however, a flexible conductor may be connected by a bolt to one end of the shank 13 of the movable jaw 6 and connected at the other end to the lug 29 on the tubular shank to which the cable 31 is connected. In this way the current will be more equally divided between the two shanks.

In operation our improved tool provides a more powerful grip upon the electrode than can be obtained with tools in which the gripping force is provided by direct spring action. Further, our improved construction has the advantage that the grip is maintained without the necessity for the operator to exert continual pressure on the handle.

In addition our improved tool can be manipulated by one hand, as it is a simple matter to push the operating handle a very short distance away from the tubular insulating handle to make the toggle mechanism pass the dead-centre position in the reverse direction, after which the spring completes the movement.

What we claim then is:

1. An electrode holder of the kind referred to, including a pair of jaws, a shank for each of said jaws, one of said shanks being of channel form in which the other shank is slidably mounted for moving the jaws in relation to one another, an abutment in said channel-like shank, toggle mechanism including toggle links, said toggle links being connected between one end of the slidably mounted shank and said abutment, an operating handle for moving said toggle mechanism, spring means associated with the toggle mechanism, and said toggle links being movable through an over-dead-centre position, so that the grip on the electrode is maintained automatically without the necessity of the operator maintaining pressure on the operating handle.

2. An electrode holder of the kind referred to, including a pair of jaws, a shank for each of said jaws, one of said shanks being of channel form in which the other shank is slidably mounted for moving the jaws in relation to one another, an abutment in said channel-like shank, toggle mechanism including toggle links movable through an over-dead-centre position, said toggle links being connected between one end of the slidably mounted shank and said abutment, and spring means associated with the toggle mechanism for urging said toggle links in both directions from said over-dead-centre position to retain the jaws in the closed position when the links are moved in one direction through the dead-centre position and to move the jaws to the open position when the links are moved a short distance past the dead-centre position in the reverse direction.

3. An electrode holder of the kind referred to, including a pair of jaws, a shank for each of said jaws, one of said shanks being of channel form in which the other shank is slidably mounted for moving the jaws in relation to one another, an abutment in said channel-like shank, toggle mechanism including toggle links movable through an over-dead-centre position, an extension on one of said links forming an operating handle for moving said toggle links, said toggle links being connected between one end of the slidably mounted shank and said abutment, spring means associated with the toggle mechanism for urging said toggle links in both directions from said over-dead-centre position to retain the jaws in the closed position when the links are moved in one direction through the dead-centre position and to move the jaws to the open position when the links are moved a short distance past the dead-centre position in the reverse direction, and said spring means including a spring incorporated in one of said toggle links.

4. An electrode holder of the kind referred to, including a pair of jaws, a shank for each of said jaws, one of said shanks being of channel form in which the other shank is slidably mounted, toggle mechanism including toggle links movable through an over-dead-centre position, one toggle link being of L shape, a pivotal connection between the end of one arm of said L shaped link and the slidably mounted shank, an operating handle on the second arm of said L shaped link, a pivotal connection between one end of the second toggle link and said L shaped link near the junction of the two arms thereof, a pivotal connection between the other end of said second toggle link and said channel-like shank, and spring means associated with the toggle mechanism.

5. An electrode holder of the kind referred to, including a pair of jaws, a shank for each of said jaws, one of said shanks being of channel form in which the other shank is slidably mounted, toggle mechanism including toggle links, one toggle link being of L shape, a pivotal connection between the end of one arm of said L shaped link and the slidably mounted shank, an operating handle on the second arm of said L shaped link, a pivotal connection between one end of the second toggle link and said L shaped link near the junction of the two arms thereof, a spring casing in which the other end of said second toggle link is slidable, a pivotal connection between said spring casing and said channel-like shank, abutments on said spring casing and the end of said second toggle link, a strong compression spring in said spring casing and acting between said abutments, and said toggle links being arranged to pass slightly through an over-deadcentre position, so that the grip on the electrode is maintained automatically without the necessity of the operator maintaining pressure on the operating handle.

6. An electrode holder of the kind referred to, including a pair of jaws, a shank for each of said jaws, one of said shanks being of channel form in which the other shank is slidably mounted, toggle mechanism including toggle links movable through an over-dead-centre position, one toggle link being of L shape, a pivotal connection between the end of one arm of said L shaped link and the slidably mounted shank, an operating handle on the second arm of said L shaped link, a pivotal connection between one end of the second toggle link and said L shaped link near the junction of the two arms thereof, a spring casing in which the other end of said second toggle link is slidable, a pivotal connection between said spring casing and said channel-like shank, abutments on said spring casing and the end of said second toggle link, and a strong compression spring in said spring casing and acting between said abutments for urging said toggle links in both directions from said over-deadcentre position to retain the jaws in the closed position when the links are moved in one direction through the dead-centre position and to move the jaws to the open position when the links are moved a short distance past the dead-centre position in the reverse direction.

7. An electrode holder of the kind referred to, including a pair of jaws, heat radiating fins on said jaws, a shank for each of said jaws, one of said shanks being of channel form in which the other shank is slidably mounted for moving the jaws in relation to one another, toggle mechanism connecting said shanks, said toggle mechanism including toggle links movable through an over-dead-centre position, one toggle link being of L shape, a pivotal connection between the end of one arm of said L shaped link and the slidably mounted shank, an operating handle on the second arm of said L shaped link, a pivotal connection between one end of the second toggle link and said L shaped link near the junction of the two arms thereof, a pivotal connection between the other end of said second toggle link and said channel-like shank, said pivotal connections having mutually parallel axes, and spring means associated with the toggle mechanism.

8. An electrode holder of the kind referred to, including a pair of jaws, spaced parallel heat radiating fins formed integrally with said jaws, a shank for each of said jaws, one of said shanks being of channel form in which the other shank is slidably mounted for moving the jaws in relation to one another, said slidably mounted shank having grooves extending longitudinally down the sides thereof, a fin extending longitudinally down the exterior of said channel-like shank, toggle mechanism connecting said shanks, said toggle mechanism including toggle links movable through an over-dead-centre position, one toggle link being of L shape, a pivotal connection between the end of one arm of said L shaped link and the slidably mounted shank, an operating handle on the second arm of said L shaped link, a pivotal connection between one end of the second toggle link and said L shaped link near the junction of the two arms thereof, a pivotal connection between the other end of the second toggle link and said channel-like shank, said pivotal connections having mutually parallel axes, a spring casing in which the other end of said second toggle link is slidable, a pivotal connection between said spring casing and said channel-like shank, abutments on said spring casing and the end of said second toggle link, and a strong compression spring in said spring casing and acting between said abutments for urging said toggle links in both directions from said over-dead-centre position to retain the jaws in the closed position when the links are moved in one direction through the dead-centre position and to move the jaws to the open position when the links are moved a short distance past the dead-centre position in the reverse direction.

9. An electrode holder of the kind referred to comprising a pair of jaws, a shank for each jaw, one of said shanks being of hollow form, and the other of said shanks being slidably mounted within said hollow shank, said hollow shank extending beyond the end of said other shank, a stirrup pivoted in said extended part of the hollow shank, toggle links connected between the end of the sliding shank and said stirrup, an operating handle for moving said toggle links, and a spring in said stirrup and acting endwise on one of the toggle links, said toggle links being movable through an over-dead-centre position.

10. An electrode holder of the kind referred to comprising a pair of jaws, a shank for each jaw, said jaws being disposed transversely to said shanks, a longitudinal strengthening rib on one of said jaws, said rib extending around the angle between the jaw and its shank and down the side of said shank, one of said shanks being slidably mounted and guided in the other shank, an abutment in one of said shanks, toggle links connected between said abutment and the other shank, a spring acting in an endwise direction upon one of said toggle links, and an operating handle for moving said toggle links, said toggle links being movable through an over-dead-centre position.

FREDERICK GEORGE KETELBEY.
GEORGE MASON.